Sept. 25, 1962 R. E. SKOW 3,055,810
METHOD AND APPARATUS FOR PURIFYING WATER
Filed March 3, 1958 2 Sheets-Sheet 1
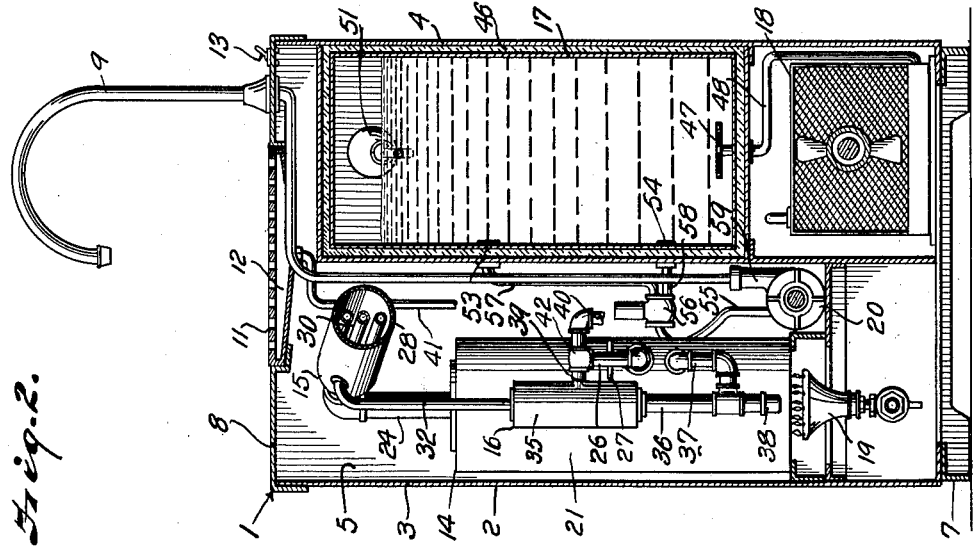
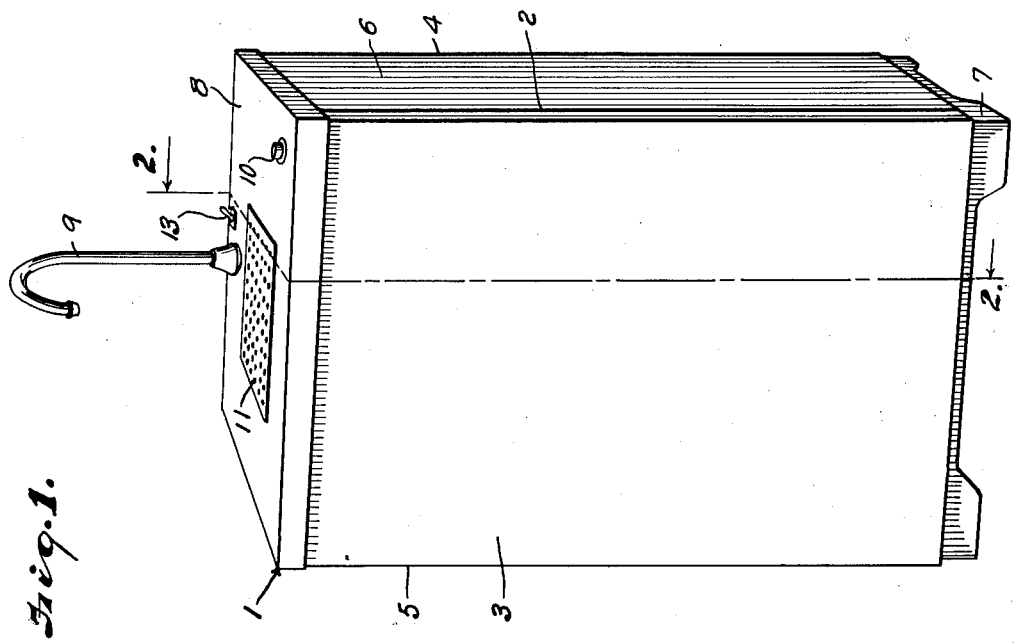
INVENTOR.
Ross E. Skow
BY
Paul E Mullendore
ATTORNEY INVENTOR.
Ross E. Skow
BY
Paul E. Mullendore
ATTORNEY 3,055,810
METHOD AND APPARATUS FOR PURIFYING WATER
Ross E. Skow, 3939 Manheim Road, Kansas City, Mo.
Filed Mar. 3, 1958, Ser. No. 718,673
6 Claims. (Cl. 202—71)

This invention relates to a method of and apparatus for obtaining pure water from water that may be contaminated with bacteria and/or mineral salts and the like that render such water unsafe or unpalatable for human consumption, the principal object being to provide for automatic purification of the raw water supply in a small self-contained unit.

It is also an object of the invention to provide a method of obtaining pure water from contaminated water by distillation, wherein the water is vaporized to evolve a pure water vapor which is condensed and cooled, all automatically responsive to removal of purified water from the cooling zone.

Further objects of the invention are to provide a method of purification wherein the contaminated matter is removed by flow of raw water from the zone of distillation responsive to expansion in volume of the raw water; to provide for removal of pure water from the cooling zone by means of a pump actuated when pure water is needed for use; to provide for selective removal of warm pure water or cold pure water, as desired, and to provide a self-contained purification unit that is easily serviced through removal of any parts that may become fouled and replacement of such parts with clean parts, thereby permitting servicing and cleaning of the fouled parts at a service shop, so that they will be available as replacement parts when needed.

It is also an object of the invention to provide an apparatus for obtaining pure water from contaminated water in which the operating parts are completely contained within an enclosure, such as the cabinet of a drinking fountain, so that the unit may be installed in any place where pure drinking water is desired.

It is also an object of the invention to provide a self-contained unit which may be located in an out of the way place, such as the basement, and the fountain or service spout may be located remotely thereof, for example, at the kitchen sink or other place where pure water is desired.

In accomplishing these and other objects of the invention hereinafter pointed out, I have provided an improved method and apparatus for obtaining pure water from a contaminated or brackish water supply, as illustrated in the accompanying drawings, wherein:

FIG. 1 is a perspective view of a self-contained unit for supplying pure water in accordance with the present invention.

FIG. 2 is a vertical section through the unit on the line 2—2 of FIG. 1.

Figure 3:
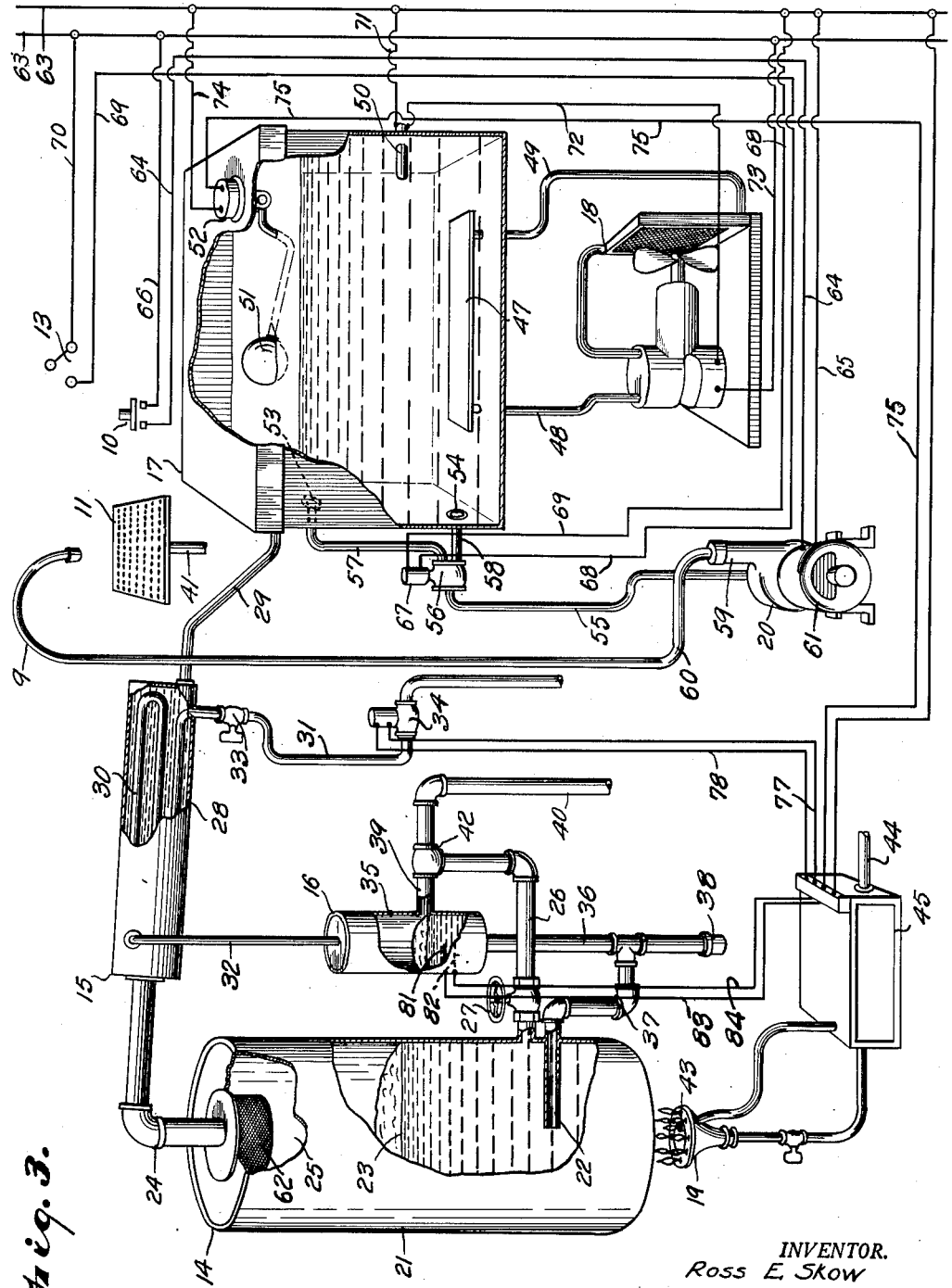
FIG. 3 is a diagrammatic view of the working parts of the unit to better illustrate the invention.

Referring more in detail to the drawings:

1 designates a self-contained unit equipped with the apparatus for purifying water in accordance with the present invention. In the illustrated instance the unit 1 is shown as including a cabinet 2, resembling the cabinet of a conventional drinking fountain wherein refrigerated water is supplied for drinking purposes. The cabinet 2 includes front and back walls 3 and 4, side walls 5 and 6, a base 7, and a top 8. The top 8 carries a spout 9 through which pure water is adapted to be discharged upon actuation of a pushbutton 10 that may also be carried by the top 8. The top also has a strainer 11 located under the discharge of the spout 9 in covering relation with a drain sump 12 which is inset within the top 8 and is adapted to be connected to a sewer for the disposal of spilled water. The top may also carry a selector switch 13 for effecting flow of cold or warmer purified water from the spout, as later described.

In carrying out the invention, the method of purifying a contaminated supply of raw water includes the steps of producing water vapors by heating the raw water, removing the vapors and passing them in heat exchange contact with an influent stream of the raw water to effect condensation of the vapors, storing the condensate to provide a supply of pure water, and cooling the water when in storage, pumping the water from storage to the discharge spout, and controlling flow of raw water into the heating zone responsive to a predetermined fall in the level of the purified water contained in storage.

The invention also contemplates automatic operation of the various steps, as well as automatic removal of contaminants from the heating zone responsive to a predetermined rise in level of the raw water therein.

The steps of the method are carried out in parts of an apparatus entirely enclosed within the cabinet 2, as now to be described.

The apparatus includes an evaporator 14, a condenser 15, a liquid level controller 16, a storage tank 17, a refrigerating unit 18, a heater 19 for the vaporizer, and a pump 20 for withdrawing water from the storage tank.

The storage tank 17 is mounted within the rear portion of the cabinet and is supported above the base 7 to provide space thereunder for containing the refrigerating unit 18. The evaporator 14, condenser 15 and liquid level controller 16 are contained within the cabinet in the space in front of the tank 17, with the evaporator 14 being supported above the base 7 to accommodate the heater 19 thereunder. The pump 20 is also carried on the support for the evaporator 14. The condenser 15 and controller 16 are supported from the evaporator by the various pipes through which the liquids are conducted, as later described. The various automatic controls, electrical wiring, and motor for driving the pump are also contained within the cabinet, thereby providing a completely contained unit which may be installed wherever a supply of pure water is required.

The evaporator 14, in which the raw water is heated and vaporized, includes a preferably elongated cylindrical vessel 21 vertically supported in its space within the cabinet, as best shown in FIG. 2. The vessel 21 has an inlet nozzle 22 extending through the wall thereof and discharging near the center thereof for admitting raw water, which rises within the vessel to a predetermined level, as indicated at 23. The upper end of the vessel is connected with the heat exchanger 15 by a pipe 24 whereby vapor accumulating within the space 25 in the upper end of the vessel is conducted to the heat exchanger 15. Also connected with the interior of the vessel at a point below the liquid level 23 is a discharge pipe 26 through which raw water is discharged from the still to carry off the contaminants, as later to be described. The flow through the pipe 26 is regulated by a manually actuable valve 27.

The heat exchanger 15 includes an elongated tubular shell 28, arranged in the space within the cabinet, preferably on a slight incline, whereby the end that is connected with the pipe 24 is located above the opposite end from which condensate drains to the storage tank 17 through a pipe 29. Contained within the shell is a coil 30 having one end connected with a raw water supply pipe 31 and its opposite end with a pipe 32 that connects with the liquid level controller 16. The pipe 31 is provided with a manually actuated shutoff valve 33 and an electrically actuated valve 34 (FIG. 3) for controlling flow of raw water into the coil of the heat exchanger.

The controller 16 includes a small, preferably elongated, vessel 35 located vertically alongside the evaporator 14, as shown in FIG. 2. The upper end of the vessel is connected with the pipe 32 and its lower end is connected by a pipe 36, which in turn connects with the nozzle 22 through a branch pipe 37. The pipe 36 depends below the branch pipe 37 and the end thereof is closed by a cap 38 whereby the evaporator and controller may be drained of water when the parts are to be replaced.

Extending laterally from the wall of the vessel 35 at a height of the cold water level to be maintained within the evaporator is a drain pipe 39 whereby excess water is discharged to a sewer or other place of disposal through a pipe 40, which may be connected with the drain pipe 41 for the drain 12. In this way the desired raw water level is established within the evaporator and an ample quantity of raw water is circulated through the heat exchanger to assure condensation of vapors flowing through the coil 30, the raw water in excess of that required to maintain the level 23 of the water in the evaporator 14 being discharged to the sewer. The discharge pipe 26 is connected with the pipe 39 by a T fitting 42, so that there is no flow from the evaporator 14 by way of the pipe 26 when the surface levels of the water in the evaporator 14 and in the vessel 35 are equal.

The type of burner 19 is dependent upon the fuel to be used, but it is any one of the many types of automatic burners now on the market. The burner and the pilot 43 thereof are supplied with fuel through a pipe 44 under control of the usual automatic safety devices contained within the housing 45, and which specifically form no part of the present invention, since any type of automatic control may be used.

The storage tank 17 has the walls thereof suitably insulated, as indicated at 46 (FIG. 2), and contains a refrigerant expansion element 47, preferably of the plate type. The element 47 is mounted near the bottom of the tank to maintain a substantially lower temperature zone at the bottom of the tank. The element 47 is supplied with refrigerant from the refrigerating unit 18, through pipes 48 and 49, which unit is controlled by a thermostatic element 50. A predetermined liquid level is maintained within the tank 17 by means of a float 51, operably connected with a switch 52 that is connected in circuit with the electrical controls of the burner, as later described.

In order to draw off the cold water at the bottom of the tank, or warmer water from the upper portion of the tank, the tank has upper and lower outlets 53 and 54. The inlet of the pump 20 is, therefore, connected by a pipe 55 with a three-way electrically operated valve 56 which connects with branch pipes 57 and 58 leading, respectively, from the outlets 51 and 52 of the tank. In this way water at different temperatures may be drawn from the tank, depending upon setting of the valve 56, the setting of the valve being effected by the switch 13, previously described. The discharge 59 of the pump 20 is connected with the spout 9 by a pipe 60. The pump is operated by a motor 61 actuated responsive to manipulation of the pushbutton 10, previously described.

In order to prevent carryover of free moisture and form from the evaporator, the vapor outlet thereof is preferably covered by a suitable screen or other type of mist extractor 62.

The electrical system includes main conductors 63 and 63' that are adapted to be connected to a current supply. One terminal of the motor 61 is connected with the pushbutton switch 10 by a conductor 64. The other terminal of the motor is connected directly with the conductor 63' by a conductor 65 and circuit is completed through the switch 10 by a conductor 66 leading to the conductor 63.

The valve 56 normally connects the outlet 54 with the pipe 55, but the valving element of the valve is adapted to be shifted to connect the outlet 53 with the pipe 55 upon closing of the switch 13 to energize the actuator 67 therefor, which is connected to the conductor 63 by a conductor 68 and to the switch 13 by a conductor 69, the circuit being completed through a conductor 70 that connects the switch 13 with the conductor 63'.

The thermostat switch 50 connects the motor 61 of the refrigeration unit 18 into circuit by conductors 71, 72 and 73. The switch 52 that is actuated by the float 51 closes an electric circuit through wires 74, 75 and 76 to the gas control valve contained within the housing 45 and also to the electrical winding of the electrically actuated valve 34 through conductors 77 and 78.

The apparatus is also equipped with a safety device so that in case the water supply to the pipe 31 is shut off, the burner 19 will also be shut off. This is effected by providing the level controller 16 with spaced apart electrodes 81 and 82 arranged to extend into the water in the bottom of the vessel 35. The electrodes are connected by wires 83 and 84 to the gas control apparatus in the housing 45. When the water supply is shut off, the water level in the vessel 35 will soon drop below the upper electrode 81, thereby breaking the circuit through the wires 83 and 84 to automatically shut off the burner as long as the water level in the controller 16 is below the upper electrode. However, when the water supply is again effective, the water will flow into the vessel 35 to again reestablish the electrical circuit through the wires 83 and 84 to render the burner controls effective in supplying gas to the burner.

In carrying out the method of purifying raw water, using the apparatus constructed and assembled as described, the unit is placed in its desired location. The pipe 31 is connected with a raw water supply, and the pipes 40 and 41 are connected with a sewer or other waste water disposal. The gas pipe 44 is connected with a gas supply line and the pilot is lighted. When these connections have been made, the unit is placed in operation by opening the valve 33 and connecting the conductors 63 and 63' with a source of electric current. Current now flows to the burner controls and to the actuator for the valve 34. The gas is now being supplied to the burner and is ignited by the pilot 43. The valve 34 is opened and is held open by the current flow. When the valve 33 is opened, raw water flows through the valve 34, pipe 31, coil 30, and pipe 32, into the liquid level controller 16. The flow of raw water will pass through the liquid level controller by way of the pipe 36, branch pipe 37, and nozzle 22 into the evaporator. When the hydrostatic level of raw water in the evaporator rises to the outlet pipe 39 of the liquid level controller, the excess water will be discharged to the sewer through the pipe 40. The water in the evaporator will be heated to boiling temperature to evolve pure water vapors. The vapors will accumulate within the space 25 of the evaporator and be discharged through the screen 62 and pipe 24 into the shell 28 of the heat exchanger, where the vapors are condensed by indirect contact with the relatively colder raw water passing through the coil 30 to the evaporator. The condensate, which is pure water, is discharged from the heat exchanger through the pipe 29 into the storage tank 17. The temperature maintained in the evaporator is such that the contaminants remain in the body of raw water contained within the evaporator. The contaminants are removed by drawing off a portion of the raw water through the pipe 26 and T 42 after the raw water has been heated sufficiently to raise the level 23 thereof above the hydrostatic level of the inlet of the pipe 39. Therefore, as long as the raw water is heated, there is a continuous flow from the evaporator to the sewer in sufficient amount to remove the contaminants and prevent accumulation thereof within the evaporator. The water will rise in the storage tank until the float 51 has lifted sufficiently to actuate the switch 52, whereupon the circuit is broken to the gas valve and valve 34 by way of the conductors 74 and 75, thereby shutting down the evaporator and stopping flow of raw water thereto.

With the thermostat switch 50 in operation, the heat of the purified water in the tank 17 will effect closure of the circuit through the conductors 71 and 72 to the refrigeration unit for placing the refrigerating unit in service for supplying refrigerant to the expansion element 47 and effect cooling of the water in the tank until the thermostat 50 has been satisfied, whereupon the refrigerating unit is automatically shut down until the temperature again rises within the storage tank, whereupon the refrigeration unit will again be set into operation to maintain a desired low temperature of the purified water.

When water is to be drawn through the spout 9, the pushbutton switch 10 is actuated to close circuit to the motor through the conductors 64, 65 and 66 to energize the motor 61 and start operation of the pump 20 to withdraw cold water through the outlet connection 54 and pipe 55 and discharge it through the pipe 60 and spout 9 under pressure of the pump. When the push-button is released, the circuit is opened automatically to stop operation of the pump 20. Any spillage from the spout 9 is carried off through the drain 12. When the level of the purified water falls in the storage tank to the point where the switch 52 closes circuit, gas is again admitted to the burner to heat the water in the evaporator. The valve 34 is opened simultaneously to continue admission of raw water to the evaporator. The apparatus will continue to operate on the heating cycle until sufficient purified water has been produced to replenish the water removed from the storage tank, whereupon the float 51 is again effective to result in shutting off the supply of raw water to the evaporator and suspending operation of the burner.

With the electrodes 81 and 82 in circuit with the control circuit supplying the gas to the burner, it is impossible for the burner to continue operation in case of failure of the raw water supply, because the burner control circuit is opened when the water uncovers the electrodes 81 and 82.

If warm water is desired, the switch 13 is actuated to close circuit through the electrical actuator 67 for the three-way valve 56 to close connection with the pipe 58 and establish connection with the pipe 57. Then when the pushbutton 10 is actuated, the relatively warmer water in the top of the storage tank is pumped to the spout 9.

From the foregoing, it is obvious that I have provided a simple method and apparatus for purifying water for drinking and household purposes which require pure wholesome water.

What I claim and desire to secure by Letters Patent is:

1. A method of supplying purified water, including distilling raw water to provide a pure water condensate, collecting said condensate to maintain a single body of purified water, supplying said condensate while warm to the upper portion of said body of purified water, refrigerating the lower portion of said body of purified water to maintain a lower concentration zone of cold purified water and an upper concentration zone of warm purified water, separately and selectively withdrawing warm and cold purified water from said zones, sensing the lowering of the upper warm concentration zone upon drawing off the cold water to control the refrigeration necessary to maintain the depth of the cold concentration zone, and controlling the distillation of the raw water responsive to lowering of the level of the warm concentration zone resulting from withdrawal of either warm or cold water to maintain the depth of said warm concentration zone.

2. A method of supplying purified water, including distilling raw water to provide a pure water condensate, collecting said condensate to maintain a single body of purified water, supplying said condensate while warm to the upper portion of said body of purified water, refrigerating the lower portion of said body of purified water to maintain a lower concentration zone of cold purified water and an upper concentration zone of warm purified water, separately and selectively withdrawing warm and cold purified water from said concentration zones, sensing the lowering of the upper warm concentration zone into the lower concentration zone upon drawing off the cold water to control the refrigeration necessary to maintain the depth of the cold concentration zone, controlling the distillation of the raw water responsive to lowering of the level of the warm concentration zone resulting from withdrawal of either warm or cold water to maintain the depth of said warm concentration zone, and drawing off raw water from the place of distillation during periods of distillation to remove therewith contaminating residue material.

3. A method of purifying raw water, including boiling a body of raw water for generating vapors from the body of the raw water, collecting a body of cool raw water having a surface level below the surface level of the body of boiling raw water, supplying cool water to maintain the body of cool water, conductng cool raw water from the collected body of cool water to near the bottom of the body of boiling water when the surface level of the boiling water falls, flowing excess of the cool raw water supply from the surface level of the body of cool water to a place of disposal when the cool water supply is not needed to maintain the surface level of the boiling water, conducting hot water from the body of boiling water to a level with the surface of the body of cool water for disposal with the surplus raw water for removing contaminants from the boiling water responsive to differential surface levels of the bodies of boiling and cool water, and controlling the amount of hot water to the place of disposal.

4. A method of purifying raw water as described in claim 3, and including the step of controlling the boiling of the raw water responsive to the presence of the body of cool raw water.

5. An apparatus for purifying raw water, including an evaporator, a vessel having an open flow outlet above the bottom thereof for maintaining a predetermined level of raw water in said vessel, means for supplying raw water to the vessel, a duct extending from a lower portion of the vessel and discharging into a lower portion of the evaporator to maintain a working level of raw water in the evaporator above the level in said vessel, a separate duct connected with the evaporator and having an outlet substantially at the level of liquid in the vessel for effecting flow of water from the evaporator responsive to the higher level maintained in the evaporator when the evaporator is in operation to prevent accumulation of contaminants in the evaporator, and valve means in said last named duct for controlling rate of flow of the water from the evaporator.

6. An apparatus for purifying raw water, including an evaporator, a liquid level controller including a vessel having an outlet above the bottom thereof for maintaining a predetermined level of raw water in said vessel, means for supplying raw water to the vessel, a duct extending from a lower portion of the vessel and discharging into a lower portion of the evaporator to maintain a working level of raw water in the evaporator above the level in the vessel, a separate duct connected with the evaporator and having an outlet substantially at the level of liquid in the vessel for effecting flow of water from the evaporator responsive to the higher level in the evaporator when the evaporator is in operation to prevent accumulation of contaminants in the evaporator, valve means in said last named duct for controlling rate of flow of the water from the evaporator, a burner for heating the water in the evaporator, spaced apart electrodes submerged in the raw water contained in the vessel, means for supplying a fuel to the burner, means for controlling the fuel supply to the burner, and an electrical circuit connecting the fuel supply control means with the electrodes to maintain the burner in operation as long as the raw water in the vessel establishes a current flow between the electrodes.

(References on following page)

References Cited in the file of this patent

UNITED STATES PATENTS

| | | |
|---|---|---|
| 411,292 | Moore | Sept. 17, 1889 |
| 496,488 | Rudd | May 2, 1893 |
| 604,550 | Stretch | May 24, 1898 |
| 1,154,590 | Crane | Sept. 21, 1915 |
| 1,369,438 | Jewell | Feb. 22, 1921 |
| 1,404,971 | Kells | Jan. 31, 1922 |
| 2,079,897 | Brown | May 11, 1937 |
| 2,192,879 | Brown | Mar. 12, 1940 |
| 2,341,872 | Kasold | Feb. 15, 1944 |
| 2,467,951 | Whitley | Apr. 19, 1949 |
| 2,625,506 | Baer | Jan. 13, 1953 |
| 2,657,554 | Hull | Nov. 3, 1953 |
| 2,784,879 | Fischer | Mar. 12, 1957 |